US008626556B2

(12) United States Patent
Tokosz et al.

(10) Patent No.: US 8,626,556 B2
(45) Date of Patent: Jan. 7, 2014

(54) VISUALIZING MULTIPLE TIME ZONES IN A CALENDARING AND SCHEDULING APPLICATION

(75) Inventors: Vaughn T. Tokosz, Newtown, MA (US); Patrick O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 1659 days.

(21) Appl. No.: 11/113,896

(22) Filed: Apr. 25, 2005

(65) Prior Publication Data

US 2006/0241998 A1 Oct. 26, 2006

(51) Int. Cl.
*G06Q 10/00* (2012.01)

(52) U.S. Cl.
USPC ........ 705/7.24; 705/7.12; 705/7.13; 705/7.16

(58) Field of Classification Search
USPC ................................. 705/7.11–7.42
See application file for complete search history.

(56) References Cited

U.S. PATENT DOCUMENTS

| | | | | |
|---|---|---|---|---|
| 4,549,047 | A | * | 10/1985 | Brian et al. ................. 379/88.26 |
| 4,819,191 | A | * | 4/1989 | Scully et al. .................... 715/751 |
| 5,323,314 | A | | 6/1994 | Baber et al. |
| 5,519,606 | A | | 5/1996 | Frid-Nielsen et al. |
| 5,845,257 | A | * | 12/1998 | Fu et al. ......................... 705/7.18 |
| 5,867,822 | A | * | 2/1999 | Sankar ........................... 705/7.24 |
| 5,960,406 | A | * | 9/1999 | Rasansky et al. ............. 705/7.18 |
| 6,016,478 | A | * | 1/2000 | Zhang et al. .................. 705/7.19 |
| 6,101,480 | A | | 8/2000 | Conmy et al. |
| 6,198,696 | B1 | * | 3/2001 | Korpi et al. ...................... 368/21 |
| 6,205,089 | B1 | | 3/2001 | Itoh |
| 6,219,307 | B1 | * | 4/2001 | Chitturi ........................... 368/223 |
| 6,249,486 | B1 | * | 6/2001 | Chitturi ............................. 368/21 |
| 6,295,541 | B1 | * | 9/2001 | Bodnar et al. ......................... 1/1 |
| 6,370,566 | B2 | * | 4/2002 | Discolo et al. ................. 709/206 |
| 6,622,084 | B2 | | 9/2003 | Cardno et al. |

(Continued)

FOREIGN PATENT DOCUMENTS

| | | |
|---|---|---|
| JP | 7160763 A | 6/1995 |
| JP | 8035752 A | 2/1996 |

(Continued)

OTHER PUBLICATIONS

"Special Edition Using Microsoft Outlook 2002" (Que 2001) [selected sections].*

(Continued)

*Primary Examiner* — Alan S Miller
(74) *Attorney, Agent, or Firm* — Steven M. Greenberg, Esq.; Carey, Rodriguez, Greenberg & O'Keefe

(57) ABSTRACT

A method, system and apparatus for visualizing multiple time zones can include a C&S application, an event schedule managed by the C&S application, and multiple time zone processing logic coupled to the C&S application. The multiple time zone processing logic can determine a time zone for each participant to a defined event. The multiple time zone processing logic further can render a user interface showing a local time in the determined time zone corresponding to a preferred time for the defined event for each the participant. For instance, the user interface can include an arrangement of juxtaposed time ranges for each participant, where the time ranges have a staggered appearance so that a local time for each of the time ranges corresponds to the preferred time.

6 Claims, 3 Drawing Sheets

(56) References Cited

U.S. PATENT DOCUMENTS

| | | |
|---|---|---|
| 6,647,370 B1 * | 11/2003 | Fu et al. .................. 705/7.19 |
| 7,082,402 B2 * | 7/2006 | Conmy et al. ............ 705/7.19 |
| 7,219,109 B1 * | 5/2007 | Lapuyade et al. ........ 719/318 |
| 7,856,483 B2 | 12/2010 | Fitzpatrick et al. |
| 2001/0014866 A1 * | 8/2001 | Conmy et al. ................ 705/9 |
| 2002/0038234 A1 * | 3/2002 | Fu et al. ........................ 705/8 |
| 2002/0122355 A1 | 9/2002 | Williams |
| 2002/0124000 A1 | 9/2002 | Ooishi |
| 2002/0143876 A1 | 10/2002 | Boyer et al. |
| 2002/0143877 A1 | 10/2002 | Hackbarth et al. |
| 2002/0147777 A1 | 10/2002 | Hackbarth et al. |
| 2003/0009411 A1 * | 1/2003 | Ram et al. .................... 705/37 |
| 2005/0114191 A1 * | 5/2005 | Atkin et al. ................... 705/8 |

FOREIGN PATENT DOCUMENTS

| | | |
|---|---|---|
| JP | 10333652 | 12/1998 |
| JP | 2001-318175 | 11/2001 |
| JP | 2003-085379 A | 3/2003 |

OTHER PUBLICATIONS

Special Edition Using Microsoft Outlook 2002, (Gordon Padwick, ISBN 0789725142, May 17, 2001).*

* cited by examiner

VISUALIZING MULTIPLE TIME ZONES IN A CALENDARING AND SCHEDULING APPLICATION

BACKGROUND OF THE INVENTION

1. Statement of the Technical Field

The present invention relates to the field of calendaring and scheduling systems and more particularly to the field of time zone processing when scheduling meetings, activities or appointments in a calendaring or scheduling system.

2. Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus™ Notes™, Microsoft™ Outlook™, and web-based products like Yahoo!™ Calendar™. These products allow one to manage personal events including appointments and anniversaries. C&S products also typically allow one to manage shared events, referred to generally as meetings. Electronic Calendaring and Scheduling software allows a group of people to negotiate around the scheduling of a proposed event such as a meeting, with the goal of selecting a time that allows most of the group to attend. Finding a common free time slot across multiple calendars can be challenging; but, the challenge can be compounded when different people in the group reside in different time zones.

Notwithstanding, conventional C&S products display date/time values only in respect to the time zone of the person performing the scheduling. In consequence, it can be difficult for the person scheduling an event to acquire an awareness of the typical available hours for all of the invitees to a meeting, since the person scheduling the event must first know the locations and time zones of all of the invitees, and must second compute the overlapping time zones. While this computation can be somewhat convenient where only a small number of familiar time zones are involved, the computation can become intractable when dealing with large numbers of geographies, some of which may be unfamiliar. For example, scheduling a meeting with participants across three time zones within the United States and four time zones across Dublin, China, India, and Japan can be difficult with time/date values provided only in respect to the local time zone of the person scheduling the event.

SUMMARY OF THE INVENTION

The present invention addresses the deficiencies of the art in respect to time zone processing when setting an event in a C&S application and provides a novel and non-obvious method, system and apparatus for visualizing multiple time zones in a C&S application. In this regard, a method for visualizing multiple time zones in a calendaring and scheduling system can include defining an event for a preferred time and a specified set of participants, determining a time zone for each of the participants, and rendering a user interface showing a local time in the determined time zone corresponding to the preferred time for each of the participants.

The determining step can include querying a directory to determine the time zone for each of the participants. Also, the rendering step can include computing a stagger for the preferred time for the time zone for each of the participants, generating a time range for each of the participants, staggering each time range according to the computed stagger so that a local time for the time range corresponds to the preferred time, and juxtaposing each the time range in the user interface.

A system for visualizing multiple time zones can include a C&S application, an event schedule managed by the C&S application, and multiple time zone processing logic coupled to the C&S application. The multiple time zone processing logic can determine a time zone for each participant to a defined event. The multiple time zone processing logic further can render a user interface showing a local time in the determined time zone corresponding to a preferred time for the defined event for each the participant. For instance, the user interface can include an arrangement of juxtaposed time ranges for each participant, where the time ranges have a staggered appearance so that a local time for each of the time ranges corresponds to the preferred time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for visualizing multiple time zones in a C&S application. In accordance with the present invention, associated time zones can be determined for each proposed participant to an event. Utilizing the determined associated time zones, a localized time for the proposed event can be computed for each proposed participant. Subsequently, a user interface can be generated and rendered which presents the localized times for each participant. Optionally, the user interface can include a set of staggered time ranges juxtaposed to one another showing a common time for the proposed event across all time ranges.

Figure 1:
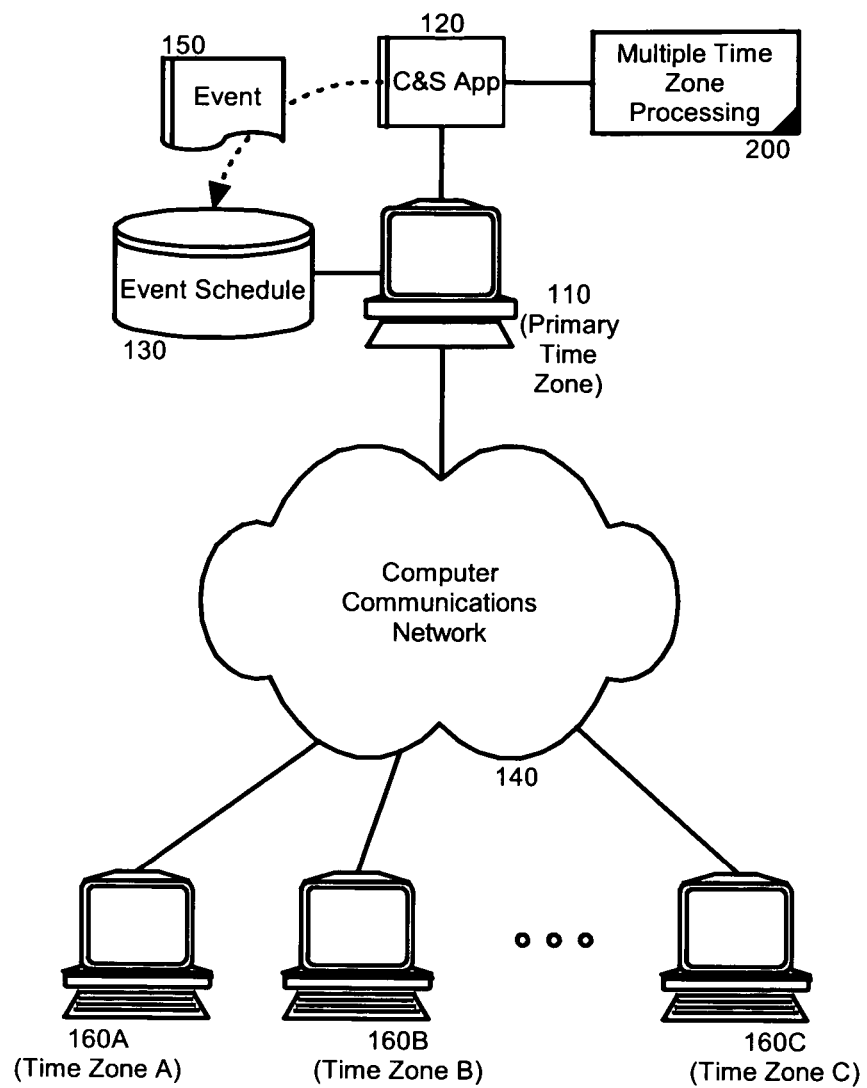
FIG. 1 is a schematic illustrating of a C&S system configured to visualize multiple time zones in accordance with the present invention.

In illustration of a particular arrangement consistent with the present invention, FIG. 1 is a schematic illustrating of a C&S system configured to visualize multiple time zones. As shown in FIG. 1, the system can include a computing platform 110 configured for communicative coupling to one or more other computing platforms 160A, 160B, 160C over a computer communications network 140. The computing platform 110 can include a C&S application 120 programmed to calendar, schedule or otherwise establish within an event schedule 130 a time for an event 150 such as a meeting, appointment, phone call and the like.

Significantly, the C&S application 120 can utilize multiple time zone processing 200 to provide a user interface to facilitate the establishment of a time for a proposed event. The multiple time zone processing 200 of the system of FIG. 1 can determine the time zone for the participants to the proposed event 150. In this regard, a time zone can be determined for each participant associated with the other computing platforms 160A, 160B, 160C. Subsequently, a user interface can be rendered in the computing platform 110 through the C&S application 120 which can provide a visual cue as to the relationship between the time zones for each participant to the proposed event 150.

Figure 2:
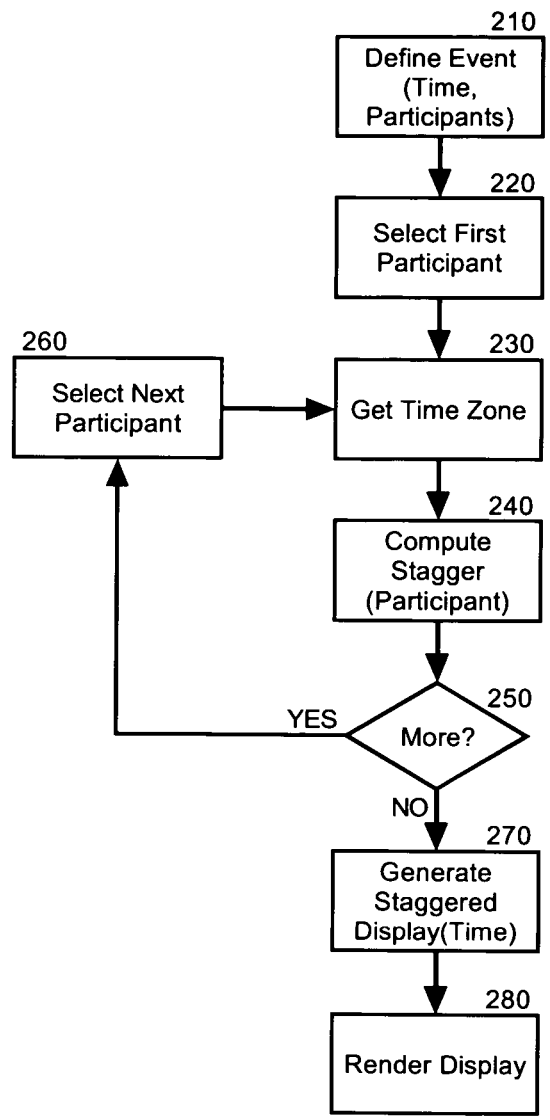
FIG. 2 is a flow chart illustrating a process for visualizing multiple time zones; and, FIG. 3 is a pictorial illustration of a user interface having a staggered presentation of multiple time zones in accordance with the inventive arrangements.

In more specific illustration, FIG. 2 is a flow chart illustrating a process for visualizing multiple time zones. Beginning in block 210, an event can be defined to occur at a particular time or within a particular block of time to include one or more other participants. In this regard, a participant can specify a particular time at which an event is to occur. Alternatively, the participant can specify a block of time during which the event is to occur. Examples can include a block of time representing working hours for the participant, or the times when the participant is expected to be present at a particular location. The data supporting the block of time can be inferred from related data disposed within a user directory or the block of time can be manually specified.

In block 220, a first participant can be selected for processing and in block 230, a time zone can be determined for the selected participant. For example, the location of the selected participant can be determined from a directory entry for the selected participant. In any case, in block 240 stagger value can be computed for the selected participant which value indicates a number of hours difference from the particular time or the particular block of time of the event for the time zone of the selected participant. This process can repeat through decision block 250 and block 260 for each of the participants.

Once all of the participants to the event have been processed, in block 270 a staggered display of time ranges can be generated and in block 280 the display can be rendered to provide a visual cue to the organizer of the event to assist in determining whether the proposed time or block of time for the event will be problematic based upon the time zone differences for the participants. To the extent that multiple participants can produce an excess number of displayed staggered time ranges, individual time ranges can be rendered for all participants residing within the individual time zones rather than rendering a separate time range for each participant who might be in the same time zone.

Figure 3:
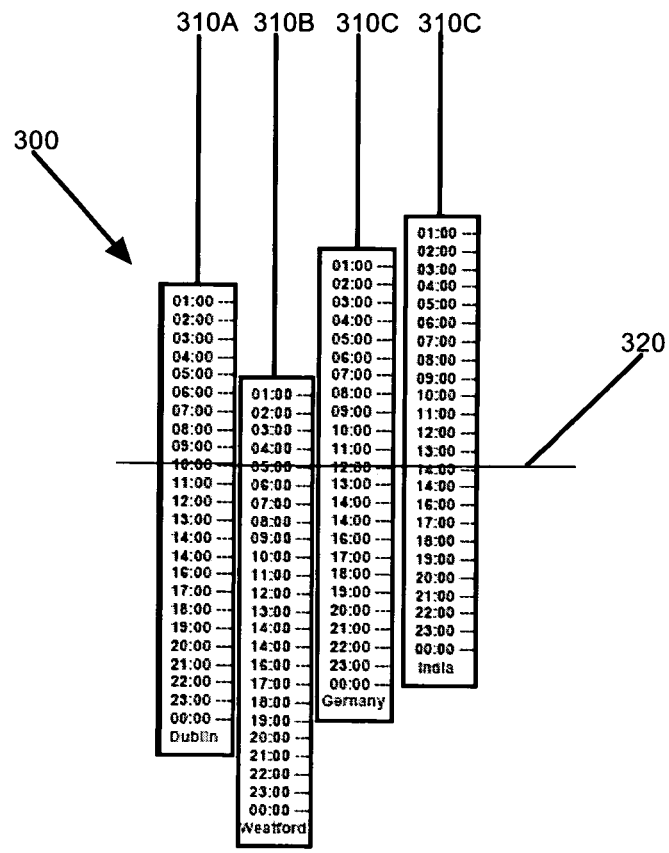

As an example, FIG. 3 is a pictorial illustration of a user interface having a staggered presentation of multiple time zones in accordance with the inventive arrangements. As shown in FIG. 3, a separate time range 310A, 310B, 310C, 310D can be provided in a user interface 300 for each of the participants in a different time zone. The selected time 320 for the event can be rendered across all of the time ranges 310A, 310B, 310C, 310D so as to provide a visual cue as to the localized time for the proposed event for all participants. In this way, the unintentional scheduling of an event at an unreasonable time for a participant in a different time zone can be avoided without requiring a cumbersome mental computation of the time zone difference—especially where multiple time zones are involved.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for visualizing multiple time zones in a calendaring and scheduling system, the method comprising the steps of:
    defining an event for a preferred time and a specified set of participants in a calendaring and scheduling system executing in a computing platform;
    determining a time zone for each of said participants and also computing a local time in said determined time zone for each of said participants that corresponds to said preferred time;
    aligning a visual display of respectively different ranges of times for each of the participants, the alignment occurring in respect to a local time in each of the ranges of times corresponding to the preferred time; and,
    rendering a user interface in the calendaring and scheduling system in the computing platform, the user interface showing, for each of said participants, the aligned visual display of respectively different ranges of times for the participants.

2. The method of claim 1, wherein said defining step comprises the step of defining an event for a preferred block of time and a specified set of participants.

3. The method of claim 1, wherein said determining step comprises the step of querying a directory to determine said time zone for each of said participants.

4. The method of claim 2, wherein said determining step further comprises the step of inferring a block of time for at least one of said participants by retrieving supplemental data from a user directory which indicates said block of time.

5. The method of claim 1, wherein said rendering step comprises the steps of:
   computing a stagger for said preferred time for said time zone for each of said participants;
   generating a time range for each of said participants;
   staggering each said time range according to said computed stagger so that a local time for said time range corresponds to said preferred time; and,
   juxtaposing each said time range in said user interface.

6. The method of claim 5, wherein said generating step further comprises the steps of:
   grouping a set of said participants having a same time range; and,
   generating a single time range for said set of said participants.

* * * * *

UNITED STATES PATENT AND TRADEMARK OFFICE
CERTIFICATE OF CORRECTION

| | | |
|---|---|---|
| PATENT NO. | : 8,626,556 B2 | |
| APPLICATION NO. | : 11/113896 | |
| DATED | : January 7, 2014 | |
| INVENTOR(S) | : Vaughn T. Rokosz and Patrick O'Sullivan | |

It is certified that error appears in the above-identified patent and that said Letters Patent is hereby corrected as shown below:

The name of inventor Vaughn T. Rokosz appears incorrectly on the title page. The Letter Patent reads Vaughn T. Tokosz. It should read Vaughn T. Rokosz.

Signed and Sealed this
Ninth Day of February, 2016

Michelle K. Lee
*Director of the United States Patent and Trademark Office*